(12) United States Patent
Nangle

(10) Patent No.: US 8,500,154 B2
(45) Date of Patent: Aug. 6, 2013

(54) REMOVABLE AXLE METHOD INCORPORATED WITHIN A COLLAPSABLE MOTORCYCLE TRAILER

(76) Inventor: Douglas Nangle, Bacup (GB)

( * ) Notice: Subject to any disclaimer, the term of this patent is extended or adjusted under 35 U.S.C. 154(b) by 754 days.

(21) Appl. No.: 12/085,609

(22) PCT Filed: Nov. 23, 2006

(86) PCT No.: PCT/GB2006/004382
§ 371 (c)(1),
(2), (4) Date: Jun. 21, 2010

(87) PCT Pub. No.: WO2007/063283
PCT Pub. Date: Jun. 7, 2007

(65) Prior Publication Data
US 2010/0259031 A1 Oct. 14, 2010

(30) Foreign Application Priority Data
Dec. 3, 2005 (GB) .................................. 0524751.5

(51) Int. Cl.
*B62D 63/00* (2006.01)
(52) U.S. Cl.
USPC .................... 280/656; 280/491.1; 280/789
(58) Field of Classification Search
USPC ....................... 280/656, 789, 491.1
See application file for complete search history.

(56) References Cited

U.S. PATENT DOCUMENTS

| | | | | |
|---|---|---|---|---|
| 3,625,545 A * | 12/1971 | Somers et al. | ............... | 280/170 |
| 3,767,223 A * | 10/1973 | Bottenberg | ................... | 280/788 |
| 3,997,186 A * | 12/1976 | Pottorff | ........................ | 280/402 |
| 4,032,167 A * | 6/1977 | Chereda | .......................... | 410/3 |
| 4,488,735 A * | 12/1984 | Hehr | ............................. | 280/656 |
| 4,752,177 A * | 6/1988 | Zenna | .......................... | 414/495 |
| 4,763,914 A * | 8/1988 | Lemmons | .................... | 280/401 |
| 5,228,712 A * | 7/1993 | Speier | ......................... | 280/401 |
| 5,340,145 A * | 8/1994 | Leib et al. | .................... | 280/656 |
| 5,570,898 A * | 11/1996 | Albert | ......................... | 280/656 |
| 5,607,176 A * | 3/1997 | Leib et al. | .................... | 280/656 |
| 5,794,959 A * | 8/1998 | Scheef, Jr. | ................... | 280/400 |
| 5,906,386 A * | 5/1999 | Baker et al. | .................. | 280/404 |
| 5,984,339 A * | 11/1999 | Guild | .......................... | 280/402 |
| 6,428,035 B1 * | 8/2002 | Maxwell et al. | ............. | 280/656 |
| 6,612,389 B1 * | 9/2003 | Bell | ............................. | 180/209 |
| 6,955,375 B2 * | 10/2005 | Thurm | ........................ | 280/656 |
| 7,004,495 B2 * | 2/2006 | Thurm | ........................ | 280/656 |
| 7,258,362 B2 * | 8/2007 | Thurm | ........................ | 280/656 |
| 7,458,602 B2 * | 12/2008 | Maxwell | ....................... | 280/656 |
| 7,681,906 B2 * | 3/2010 | Shawyer | ...................... | 280/656 |
| 2006/0284397 A1 * | 12/2006 | Lambert | .................... | 280/491.1 |
| 2008/0073881 A1 * | 3/2008 | Bennett | ........................ | 280/656 |

* cited by examiner

*Primary Examiner* — Jeffrey J Restifo
(74) *Attorney, Agent, or Firm* — Sonya C. Harris; Invention Services Beckhams IP

(57) ABSTRACT

A motor cycle trailer as shown in FIG. 1. wherein the axle item 1 can be easily removed by a locking pin arrangement without the use of tools, this enables collapsing of the trailer for storage purposes to be carried out within an acceptable time scale.

10 Claims, 2 Drawing Sheets

DETAIL A
SCALE 1 : 5

REMOVABLE AXLE METHOD INCORPORATED WITHIN A COLLAPSABLE MOTORCYCLE TRAILER

BACKGROUND TO THE INVENTION

This invention relates to the method in which the axle on a collapsible trailer, capable of carrying a single or multiple motorcycles, can be attached and removed from the trailer.

Conventional collapsible motorcycle trailers available, at the present time, require the necessity of tools to remove the main trailer axle, thus reducing the practicability of the concept of a collapsible trailer, which is—to be used for the purpose of transporting a motorcycle or motorcycles to their destination and then being able to be collapsed for storage. This storage may be in the boot of the car for a return journey, or to reduce the possibility of trailer theft and thus the operation of collapsing the trailer may be done on the roadside. It is an advantage to collapse the trailer in the minimum time period and preferably without tools, without compromising its strength. Another method of attaching the axle is to feed its whole length through a fixed aperture and fixing it centrally. This method can also require tools to fix the axle firmly in place and requires more space around the work area to withdraw the axle and often results in undesirable scratched paint or metal surfaces as withdrawal takes place. The invention seeks to improve upon the aforesaid problems and is described as follows:

SUMMARY OF THE INVENTION

The present invention consists of an axle clamp with locking pin arrangement, which is incorporated into the trailer design to enable the axle to be quickly removable without the use of any tools, whilst maintaining the strength required enabling the function of the axle, which is a critical part of the trailer.

By allowing the removal of the axle by withdrawing one locking pin and releasing the clamp, the overall time required to collapse the trailer is reduced to an acceptable timescale and no tools are required to complete the process.

Preferably, the clamping of the axle and the locking pin remove the possibility of the axle being withdrawn in any direction.

Preferably, the weight of the load carried by the trailer increases the clamping effect around the axle thus reducing the possibility of axle withdrawal.

BRIEF DESCRIPTION OF THE DRAWINGS

An example of the invention will now be described by referring to the accompanying drawings and description.

DESCRIPTION OF AN EMBODIMENT

For this example only the construction material is steel, with individual parts of the assembly screwed together, but these could also be welded together.

Figure 1:
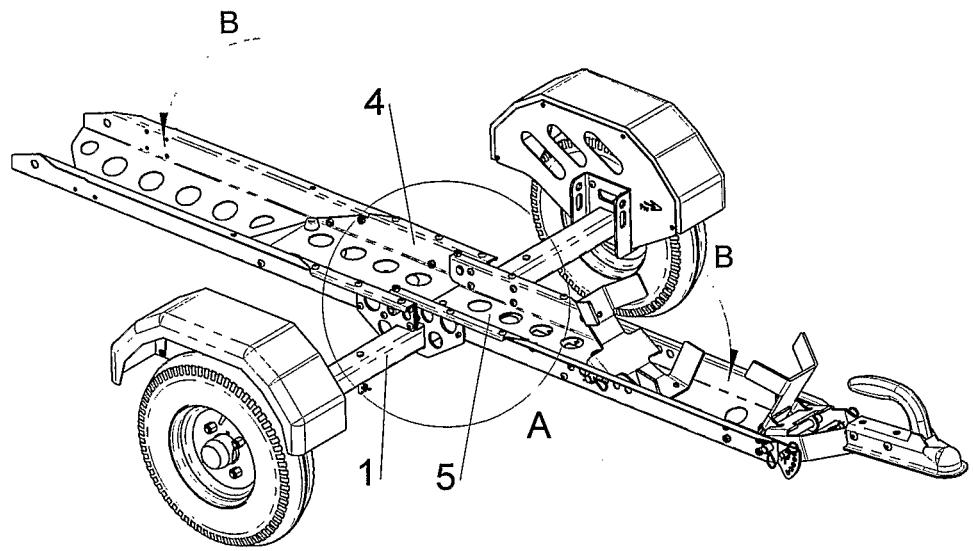
FIG. 1 shows a complete motorcycle trailer in its built-up stage incorporating other relevant parts, direction arrows marked 'B' indicate the direction of load imposed onto the trailer by the motorcycle being carried.
Figure 2:
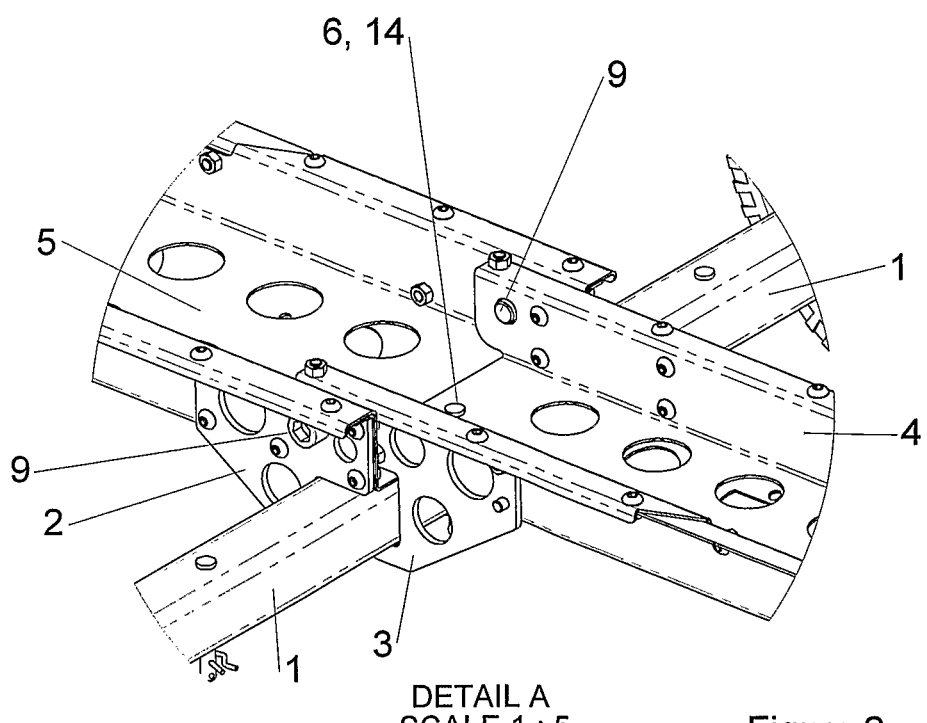
FIG. 2 shows, in close detail, the area of the axle mounting position in its normal built-up stage.
Figure 3:
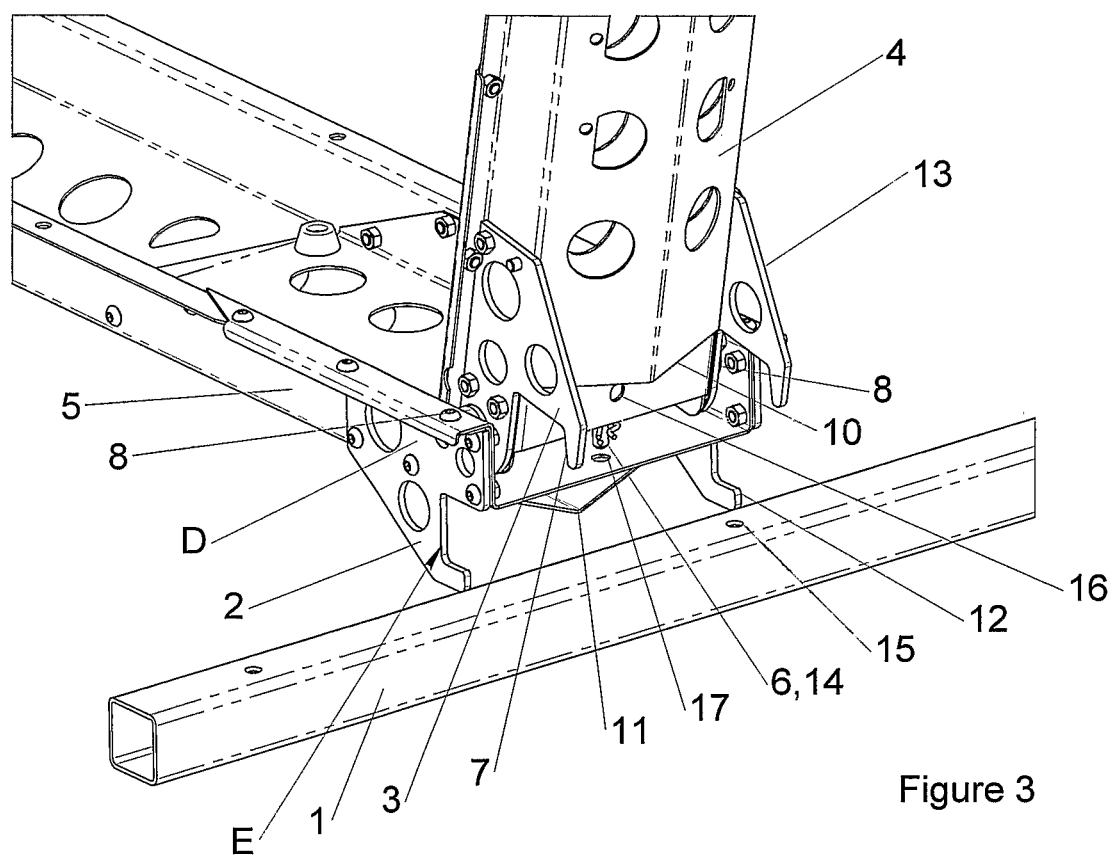
FIG. 3 shows the trailer component positions required to remove or attach the axle.

A trailer beam, 4 and 5 of FIGS. 1, 2 and 3, hinge/pivot at point 'D' this hinge point is suitably robust using pivoting bosses 8 FIG. 3, and fixing screw's 9 FIG. 2, to avoid possibility of deformation in beam sections 4 and 5 at point 'D'.

The position of pivot point D' is set centrally above the 'C' shaped opening, indicated by arrow 'E' in plate 2 FIGS. 2 and 3, and when in the closed built-up position with axle located within, is centrally above the corresponding 'C' shaped opening in 3. Pivot point 'D' facilitates the opening up of plates 2 and 3 FIGS. 2 and 3, and the closing of plates 2 and 3, so that the 'C'-shaped openings in plates 2 and 3 form a completely enclosed aperture sized accordingly to tightly fit the axle 1 FIGS. 1, 2 and 3.

Chamfer 7 FIG. 3, in plate 3 FIGS. 2 and 3, acts to lead-in the axle and add additional clamping force and gives clearance to the rotating path of plate 3 around axle FIGS. 1, 2 and 3.

The distance from the pivot point 'D' to the furthest part of the axle 1 FIGS. 1, 2 and 3, in its normal built up position, is sufficiently large enough to reduce the overall pressure on the axle 1 from plates 2 and 3 by the load indicated by arrows 13' FIG. 1 but still present enough to adequately clamp the axle 1.

Additional clamping force and clamping area is applied by trailer beam sections 10 and 11 FIG. 3, by having surfaces in line with the clamping face of plates 2 and 3, also beam sections 10 and 11 extend to the furthest parts of the clamped axle face which increases the load bearing area on all clamping components.

Identical parts to plates 2 and 3 as indicated by plates 12 and 13 FIG. 3, symmetrically positioned on the far side of the trailer to complete the clamping arrangement.

To attach axle 1 FIGS. 1, 2 and 3, to the trailer beam, beam section 4 FIGS. 1, 2 and 3, is pivotally raised as indicated by FIG. 3, allowing axle 1 to be position into the 'C'-shaped recess in plate FIGS. 2 and 3, beam section 4 is then pivotally lowered so that the 'C'-shaped recess in plate 3 FIGS. 2 and 3, encloses around and applies pressure to axle 1. Finally a locking pin 6 FIGS. 2 and 3 is passed through hole 16 FIG. 3, in beam section 4, through hole 17 FIG. 3, in beam section 5 and through hole 15 FIG. 3, in axle 1, an R-clip 14 FIGS. 2 and 3, is fitted to the end of pin 6 FIGS. 2 and 3 to prevent the removal of the pin 6.

Pin FIGS. 2 and 3, prevents the removal of axle 1 in a sideways direction and also prevents beam sections 4 and 5 FIGS. 2 and 3 from being pivotally moved in respect to each other or the axle 1.

Removal of the axle 1 is the above reverse of the procedure.

All the hereinbefore description is reliant upon both the material and dimensions satisfying the design criteria.

The invention claimed is:

1. A motor cycle trailer comprising
a main wheel axle and two trailer beams;
a hinge mechanism adjoining adjacent ends of said trailer beams, said hinge permitting the trailer beams to move from a mutually folded position to an unfolded position and vice-versa, and thus the trailer from a folded position to an unfolded position;
said trailer beams being aligned lengthways in the unfolded position;
members attached to towards adjacent ends of the trailer beams, said members comprising plates mounted on the side of the trailer beams towards adjacent ends of said trailer beams;
pairs of said members in the unfolded position clamping the main axle between them;
each of said plates having a cut out on an edge aligned with the end of the trailer beams;

said cut outs corresponding to part of the outside perimeter of the axle and in the unfolded position being around such part of the axle;

pairs of such plates, one on one beam and the other on the other beam, cooperating with each other to form a clamp around the axle and in which the axle is contained between the cut outs when the trailer is in its unfolded position;

the main axle in the unfolded position being transverse to the trailer beams.

2. A motor cycle trailer according to claim 1 further comprising:

the axle being of square cross section;

in the unfolded position, the cut-outs of two pairs of plates forming a square aperture within which the axle is clamped.

3. A motor cycle trailer according to claim 1 further comprising:

holes in the two trailer beams and the axle to receive the at least one locking pin;

a retaining clip to retain said locking pin in position in the holes when the trailer is in an unfolded position.

4. A motor cycle trailer according to claim 1 further comprising:

additional supports mounted below each trailer beam in the unfolded position;

said additional support forming a clamp between their opposed ends beneath the beams in the unfolded position;

said axle being clamped in said clamp when the trailer is in its unfolded position.

5. A motor cycle trailer according to claim 1 in which the hinge mechanism comprises bosses about which said trailer beams rotate with respect to one another.

6. A motor cycle trailer according to claim 5 further comprising screws to maintain the said beams in position to rotate with respect to the bosses.

7. A motor cycle trailer comprising
a main wheel axle and two trailer beams;

a hinge mechanism adjoining adjacent ends of said trailer beams, said hinge permitting the trailer beams to move from a mutually folded position to an unfolded position and vice-versa, and thus the trailer from a folded position to an unfolded position;

said trailer beams being aligned lengthways in the unfolded position;

members attached to towards adjacent ends of the trailer beams, said members comprising plates mounted on the side of the trailer beams towards adjacent ends of said trailer beams;

the axle being of square cross section;

in the unfolded position, cut-outs in each of two pairs of plates forming a square aperture within which the axle is clamped, each of said plates having its cut out on an edge aligned with the end of the trailer beams;

the main axle in the unfolded position being transverse to the trailer beams;

additional supports mounted below each trailer beam in the unfolded position;

said additional support forming a second clamp between their opposed ends beneath the beams in the unfolded position;

said axle being clamped in said second clamp when the trailer is in its unfolded position.

8. A motor cycle trailer according to claim 7 in which the hinge mechanism comprises bosses about which said trailer beams rotate with respect to one another.

9. A motor cycle trailer according to claim 8 further comprising screws to maintain the said beams in position to rotate with respect to the bosses.

10. A motor cycle trailer according to claim 7 further comprising holes in the two trailer beams and the axle to receive the at least one locking pin;

a retaining clip to retain said locking pin in position in the holes when the trailer is in an unfolded position.

\* \* \* \* \*